(12) United States Patent
Barwicz (10) Patent No.: US 12,399,319 B2
(45) Date of Patent: Aug. 26, 2025

(54) SHARP ADIABATIC BENDS IN LOW-CONFINEMENT STRUCTURES

(71) Applicant: Cisco Technology, Inc., San Jose, CA (US)

(72) Inventor: Tymon Barwicz, Holmdel, NJ (US)

(73) Assignee: Cisco Technology, Inc., San Jose, CA (US)

( * ) Notice: Subject to any disclaimer, the term of this patent is extended or adjusted under 35 U.S.C. 154(b) by 164 days.

(21) Appl. No.: 17/946,656

(22) Filed: Sep. 16, 2022

(65) Prior Publication Data

US 2024/0094467 A1    Mar. 21, 2024

(51) Int. Cl.
| | |
|---|---|
| G02B 6/125 | (2006.01) |
| G02B 6/12 | (2006.01) |
| G02B 6/122 | (2006.01) |
| G02B 6/136 | (2006.01) |

(52) U.S. Cl.
CPC ........... *G02B 6/125* (2013.01); *G02B 6/1228* (2013.01); *G02B 6/136* (2013.01); *G02B 2006/12097* (2013.01)

(58) Field of Classification Search
CPC ...... G02B 6/125; G02B 6/1228; G02B 6/136; G02B 2006/12097
See application file for complete search history.

(56) References Cited

U.S. PATENT DOCUMENTS

| | | | |
|---|---|---|---|
| 2002/0076188 A1* | 6/2002 | Kimerling ................ | G02B 6/12 385/132 |
| 2007/0223543 A1 | 9/2007 | Prosyk et al. | |
| 2023/0112885 A1* | 4/2023 | Xu ......................... | H04B 10/40 372/26 |

FOREIGN PATENT DOCUMENTS

| | | | | |
|---|---|---|---|---|
| JP | 2005215395 A | * | 8/2005 | |
| WO | WO-2023272691 A1 | * | 1/2023 | ............... H01S 3/13 |

OTHER PUBLICATIONS

Cao G.B. et al: "Compact integrated star coupler on silicon-on-insulator", IEEE Photonics Technology Letters, vol. 17, No. 12, Dec. 2005 (Dec. 2005), pp. 2616-2618.
Akiyama Shoji et al, "Air trench waveguide bend for high-density optical integration", Proceedings of SPIE, vol. 5355, May 28, 2004, pp. 14-21.
Navalakhe Rupesh Kumar et al, "Design of Low-Loss Compact 90° Bend Optical Waveguide for Photonic Circuit Applications in SOI Platform", 2008 IEEE Region 10 Colloquium and the Third International Conference on Industrial and Information Systems, Dec. 2008 (Dec. 2008), pp. 1-5.
Extended European Search Report for European Application No. 23197505.3-1020 dated Feb. 15, 2024 (11 pages).

\* cited by examiner

*Primary Examiner* — Thomas A Hollweg
*Assistant Examiner* — Marc E Manheim
(74) *Attorney, Agent, or Firm* — Patterson + Sheridan, LLP (57) ABSTRACT

In part, the disclosure relates to a photonic device that includes a curved waveguide. The curved waveguide includes a curved elongate structure that includes a ridge. A first cross-section of the ridge has a first shape that substantially extends along the first elongate section of the curved elongate structure. The curved elongate structure defines a first elongate section, a second elongate section, and a third elongate section. At least one of the elongate sections has a non-linear curvature. The curved waveguide includes a plurality of layers. The photonic device also includes a trench defined by one or more of the plurality of layers.

18 Claims, 9 Drawing Sheets

SHARP ADIABATIC BENDS IN LOW-CONFINEMENT STRUCTURES

FIELD

This disclosure relates generally to the field of integrated photonics.

BACKGROUND

Contemporary optical communications and other photonic systems make extensive use of photonic integrated circuits that are advantageously mass-produced in various configurations for various purposes.

SUMMARY

In part, in one aspect, the disclosure relates to an efficient bending of waveguides in photonic integrated circuits. In one aspect, the disclosure relates to a particular shape of a bend in a waveguide such that the waveguide curvature transitions adiabatically from a value near zero, corresponding to a substantially straight waveguide, to a substantially constant, finite value encompassing a majority of the bend, and then back to a near-zero curvature as the waveguide completes the bend and returns to a substantially straight path. In part, in one aspect, the disclosure also relates to a microfabricated structure that enhances optical confinement in a waveguide bend. In various embodiments, the waveguide is a multi-layer device. In some embodiments, one of the foregoing layers is a confinement layer. In many embodiments, the confinement layer comprises one or more quantum well structures that prevent vertical leakage of an optical mode into a substrate. More specifically, the disclosure relates to a particular placement of a deep etch near to a waveguide bend such that the deep etch partially overlaps the waveguide bend and induces a net reduction in optical losses through the bend as compared to similar structures wherein a trench is formed adjacent to but not overlapping a waveguide such as by etching one or more layers of a PIC or other layers. In various embodiments, a deep etch refers to an etch having a depth that ranges from about 1 µm to about 10 µm or from about 2 µm to about 5 µm or between about 3 µm to about 4 µm. In part, the disclosure relates to a photonic device. The device may include a curved waveguide that includes a plurality of layers; a curved elongate structure defining an upper surface, an inner elongate surface, and an outer elongate surface, the curved elongate structure comprising a first end, and a second end, the first end in optical communication with the second end; and a ridge extending from the upper surface, the ridge having a first side and a second side; and a trench defined by one or more of the plurality of layers and the first side; wherein the curved elongate structure defines a first elongate section and a second elongate section, wherein a first cross-section of the ridge has a first shape that substantially extends along the first elongate section of the structure, wherein the first shape is defined by the first side and a step extending from the first side and above the bottom of the trench. In some embodiments, the trench follows the first side and bends therewith. In various embodiments, a second elongate section comprises a curvature transition section wherein curvature changes in the curvature transition section are non-linear in curvature space. In some embodiments, at a normalized position of 50 to 75% along the optical path of the curvature transition section, the curvature is reduced by about 10% to about 60% of a linear curvature in curvature space.

In various embodiments, the curvature transition section transitions to a section of constant curvature in the first elongate section, wherein the first elongate section defines a bend. In some embodiments, a curvature of the bend ranges from about 1 mm$^{-1}$ to about 100 mm$^{-1}$ or from about 5 mm$^{-1}$ to about 20 mm$^{-1}$. In various embodiments, one or more of the plurality of layers comprise a compound semiconductor. In some embodiments, the curved waveguide further comprises a confinement layer disposed below the ridge, the confinement layer comprising a plurality of quantum wells. In various embodiments, the confinement layer is configure to not absorb propagating light in response to being in one or more pumped states.

In some embodiments, the device may further include a third elongate section, wherein the waveguide defines a bend in the first elongate section, wherein the first elongate section has a constant radius of curvature, wherein the second elongate section comprises a non-linear curvature transition, wherein the trench approaches the waveguide in the third elongate section. In various embodiments, the ridge has a ridge width, wherein a percent increase in a normalized ridge width changes in response to a normalized position along the third elongate structure is selected such that when the normalized position is about 20%, the normalized ridge width ranges from about 30% to about 50%; and when the normalized position is about 80%, the normalized ridge width ranges from about 65% to about 85%.

In some embodiments, the ridge has a ridge width, wherein the ridge width increases in an amount that ranges from about 0 to about 1 µm or about 0.25 µm to about 0.5 µm over a transition distance. In various embodiments, a length over which the curved waveguide exhibits a taper in width is between about 50 to about 500 µm or between about 100 to about 250 µm or about 150 µm. In some embodiments, a starting gap between the trench and the ridge ranges from about 1 µm to about 10 µm, or from about 3 µm to about 5 µm, or is about 4 µm. In various embodiments, the gap between the trench and the ridge has been reduced by 50 to 70% from the starting gap at a normalized position of 20% along the third elongate section. In various embodiments, the trench comprises the bottom, an outer trench wall and an inner trench wall, wherein the inner trench wall is defined by the step that extends upwards from the bottom and then towards the waveguide before continuing upwards to end along the first side of the ridge. In some embodiments, the step has a width that ranges from about 0.1 to about 1 µm.

In various embodiments, the waveguide is configured to propagate light having a wavelength that ranges from about 1250 nm to about 1650 nm. In some embodiments, the device may further include one or more optical amplifier devices in optical communication with the first end or the second end. In part, the disclosure relates to a method for curving light in an integrated photonic structure. The method may include providing a curved waveguide comprising a plurality of layers; a curved elongate structure defining an upper surface, an inner elongate surface, and an outer elongate surface, the curved elongate structure comprising a first end, and a second end, the first end in optical communication with the second end; and a ridge extending from the upper surface, the ridge having a first side and a second side; a trench defined by one or more of the plurality of layers and the first side; and a confinement layer disposed below the ridge, the confinement layer comprising a plurality of quantum wells; wherein the curved elongate structure defines a first elongate section and a second elongate section, wherein a first cross-section of the ridge has a first shape that substantially extends along the first elongate section of the structure, wherein the first shape is defined by the first side and a step extending from the first side and above the bottom of the trench; propagating light of a wavelength between 1250 and 1650 nm in the ridge; and applying an electrical signal to pump the plurality of quantum wells through an electrode disposed on ridge to pump one or more quantum wells.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, confinement layers, ridges, quantum wells, dielectrics, inputs, outputs, ports, adiabatic bends, trenches, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Applicant has realized that curved waveguides may introduce losses, and that typical approaches to mitigating these losses, namely the use deep etches near the waveguide bend, may be improved. Although counter-intuitive, placement of etches to define a curved trench that tracks the bend of the waveguide over one or more sections of the waveguide offers various advantages. In addition to optimization of the geometry, sections of the waveguide having a constant radius of curvature with other sections of the waveguide having non-linear radiuses of curvature support the construction of a waveguide having an adiabatic bend that deviates from a purely semicircular bend. In various embodiments, the etch/trench and the waveguide follow each other in various sections of the waveguide.

In part, the disclosure pertains to photonic circuits, devices, and components thereof, which involve guiding and manipulating light in structures fabricated using planar microfabrication processes. In particular, this disclosure pertains to bending integrated photonic waveguides more efficiently in various embodiments. In various embodiments, a given waveguide-based device includes a ridge waveguide that is curved and substantially symmetric with a series of segments along its length that have differing cross-sections, tapers, transitions, and curvature changes that are variable or non-linear in curvature space. In various embodiments, a given exemplary curvature is the inverse of the radius of curvature and vice versa.

In various embodiments, the disclosure relates to non-planar waveguides such as channel waveguides that are curved and disposed relative to air trenches or gaps. The air trenches or gaps may be formed by various etching-based fabrication techniques.

In some embodiments, the channel waveguides are curved waveguides such as curved ridge waveguides or curved rib waveguides. In some embodiments, a ridge waveguide is surrounded by air trenches or air gaps or low-index materials to confine optical signals within a wave propagating region within the ridge. A given waveguide may be curved and have different sections or segments along its length. Some waveguides may include various bends that are defined by a bend angle that ranges from about 20 degrees to about 180 degrees. In various embodiments, different layers and region of materials may be arranged, deposited, sandwiched and etched to form a curved waveguide such as ridge waveguide or a photonic device that includes a curved waveguide such as a ridge waveguide. Suitable materials for the various layers and regions may include, without limitation, InP or GaAs containing material, AlGaInAs or InGaAsP containing material, semiconductors, metals, electrode regions, dielectrics, passivation layers or regions, and metallization layers or regions, and combinations of the foregoing.

Figure 1:
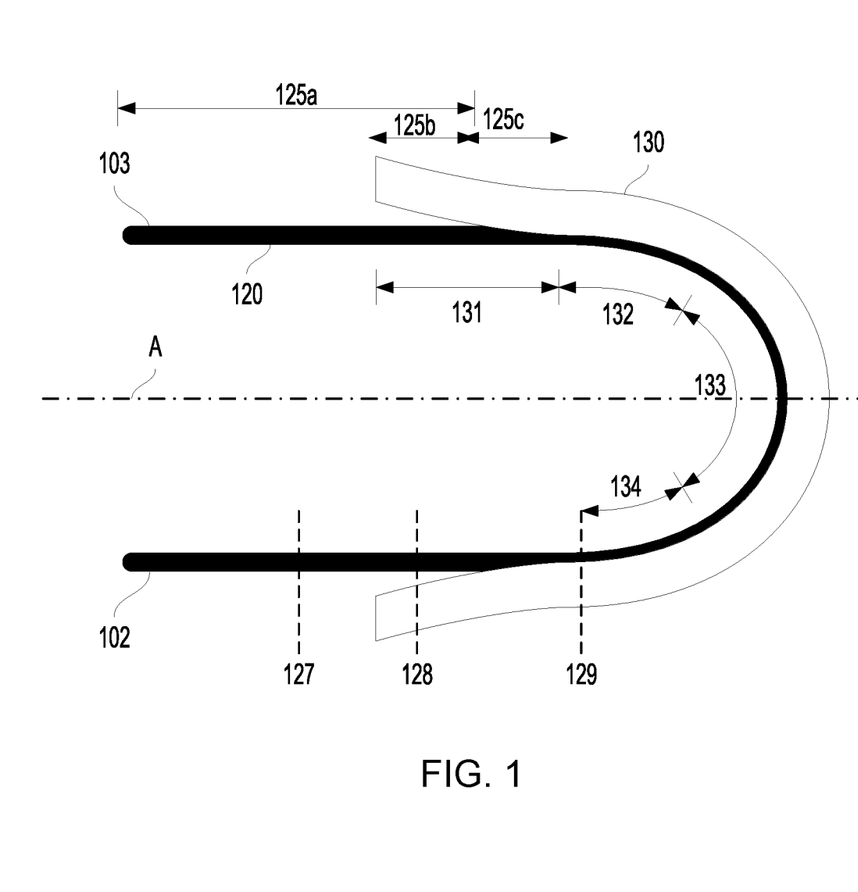
FIG. 1 is a top-down view of a waveguide as it bends and a curved trench that approaches the waveguide and overlaps the waveguide in one or more sections of the waveguide while showing other sections of the waveguide having differing cross-sections along its length according to an exemplary embodiment of the disclosure.

Refer now to the exemplary embodiment of FIG. 1, wherein a top-down view of a waveguide 120 and a deep etch or trench formed thereby 130 is illustrated. The waveguide is an elongate structure that may be formed by a stack of two or more layers. In various embodiments, the layers extend along and follow the curve or bend of the waveguide. The height and depth profile of a cross-section of the waveguide in various sections may change such that the width and presence of various layers and the structures and surfaces they form changes. The waveguide 120 includes an optical inlet or first end 102 and an optical outlet or second end 103, and a bend that is surrounded by and/or is tracked by a trench 130 formed by a deep etch. The bend may include various sections or segments such as sections/segments 132, 133, and 134. In some embodiments, the bend may also begin earlier such as in section 131.

In some embodiments, a section of the waveguide such as section 125a may include the elongate structure of the waveguide 120 without the trench 130/deep etch being present. In addition, as shown, in the subset 125b of section 125a, the trench 130 approaches, but does not reach the waveguide until a little after the midpoint of section 131. A ridge or ridge wave-guide (not shown) extends from the upper surface of curved waveguide 120 in various embodiments. As shown in and discussed in more detail with regard to FIGS. 3, 4, 5A, and 5B and others, the shape of a given cross-section of the waveguide may change along sections 131, 132, 133, 134, and mirrored or symmetric sections on the other side of the waveguide 120. In particular, the width of the ridge and the existence of a trench adjacent the ridge and the distance between the ridge and trench changes along the curved length of the waveguide in various sections. Changing the width of the ridge and removing a portion of one or more layers of the stack of layers that form the ridge occurs in one or more sections of the waveguide.

Generally, in various embodiments, the etch and the waveguide follow each other. In various embodiments, the cross-section of the waveguide relative to an axis of light propagation is variable. For example, along the length of a given curved waveguide, the cross-sectional shape along a first segment may be constant and then the cross-sectional area may change along a subsequent section of the waveguide that is continuous with the first. A waveguide 120 may be formed from various layers including a substrate upon which it may extend or be disposed on or part of. In various embodiments, the cross-sectional area of a slice along the second section will be less than that of the first section and may continue to decrease as a result of the etch approaching the second region of the waveguide.

For example, the cross-sectional area of the waveguide in section 125a or 125b would be greater than the cross-sectional area of the waveguide in section 125c or 130. This follows from the etch approaching the waveguide and removing a portion of the stack of layers that form the structure of the waveguide and thus reducing its cross-sectional area and other measurable length changes. In some embodiments, the waveguide may be initially fabricated with a width wider than a final target width, in anticipation of a loss of some of the cross-sectional area of the waveguide to the deep etch. In a region 131 of the waveguide, the trench 130 begins to approach the waveguide. The curved waveguide of FIG. 1 shows a 180 degree bend with light entering waveguide on one side and exiting the waveguide on the other side. Various bends for the curved waveguide may be used without limitation, including, for example, bends that range from about 0 degrees to about 360 degrees.

Still referring to FIG. 1, an axis A is also shown which intersects the waveguide 120 in a section of constant curvature 133 and divides or sections the waveguide bend. For example, region or section 133 is divided by axis A and regions or sections 132 and 134, which have the same cross-sectional shape in various embodiments, are on either side of the A axis. A section that includes non-linear and/or adiabatic transitions in curvature 132 is shown as a section that extends from section of constant curvature 133. Similarly, section 134 also exhibits a curvature transition for the structure of the waveguide. In various embodiments, the curvature transition and changes in the shape of the cross-sectional areas of the waveguide structure in sections 132 and 134 are substantially the same. In some embodiments, another section 134 that includes non-linear and/or adiabatic transitions in curvature extends from the other end of section 133. In some embodiments, one or more of the features above may interface with or be disposed relative to a substrate. An exemplary substrate, in another embodiment, could be a Si wafer with patterned waveguides. In other embodiments, the various materials and layers disclosed herein may be used as the substrate or disposed on or near the substrate. In various embodiments, the various sections shown in FIG. 1 and described elsewhere herein may be referenced to as first, second, third, fourth, fifth, etc., sections with regard to how they are depicted and arranged in FIG. 1. These terms may be used for selection sections and describing their structure, layers, and geometry without limitation.

As shown in FIG. 1, the waveguide has an overall U-shaped geometry wherein the bend portion of the U is designed to avoid a pure semicircular bend. Other waveguide shapes with curves and bends that range over various angles are possible. In various embodiments, a straight waveguide such as one having a 180 degree bend is avoided. As shown, the bend is about 180 degrees (which results in input 102 and output 103 being oriented as shown), but other bend angles may be selected without limitation. In some embodiments, the waveguide 120 is symmetric about the axis A shown such that it divides a region of non-linear curvature such as region 133.

In various embodiments, the lengths of the sections of the waveguide on either side of the axis A may be the same or different. In various embodiments, waveguide shapes that reduce losses compared to Euler bends and other bends such as circular or elliptical bends are used when selecting the various sections and radiuses of curvature properties for a given waveguide section. In various embodiments, a given curved waveguide embodiment includes segment or section that undergoes curvature changes that are non-linear in curvature space. This is in contrast with an Euler curve, which is linear in a curvature space. In some embodiments, a curvature space is a representation of curvature that compares relationship of curvature versus position, such as a normalized position.

To improve photon confinement within a waveguide bend, a deep etch surrounding the bend may be used to form a trench, such as an air-filled trench or air gap, at either side or both sides of the waveguide. However, placement of air trenches on both sides of the waveguide may create substantial scattering losses. In addition, placement of air trenches on both sides of the waveguide may introduce cooling issues in active waveguides. In various embodiments, a trench may be defined relative to one side of the waveguide bend, such as on the exterior of the bend that has various geometric features that vary along the length of the bend. In some embodiments, the overall length of the curved air-filled trench ranges from about 110 µm to about 2000 µm. In some embodiments, the length of the air-filled trench varies based on radius of curvature and angle of arc of the waveguide and lengths and the region where the trench overlaps with the waveguide.

To improve photon confinement within a waveguide bend, a single deep etch may be used to form a trench near the waveguide bend. The waveguide and the trench are formed in one or more layers, which may be the same or have layers in common in some embodiments. In some embodiments, the waveguide includes various layers including an upper ridge. The upper ridge may include an electrode with a contact layer. In some embodiments, the trench is etched next to the ridge and waveguide and has a step or notch that extends out from the waveguide into the bottom of the trench.

Refer now to the exemplary embodiment of FIG. 1, wherein a waveguide 120 is bordered by a trench 130 formed by a deep etch. Certain cross-sectional planes 127, 128, 129 indicate locations of cross-sectional views in other figures. The etch 130 is defined by various lengths, sections, regions, depths, widths and other parameters. In some embodiments, the etch is defined, in part, by an approach length 131, a gradual, continuous, two sections of non-linear and/or adiabatic transitions in radius of curvature 132, 134 and a section or arc of constant curvature 133.

In some embodiments, a deep etch placed near a waveguide bend may approach the waveguide bend, i.e. the path of the etch may begin some distance away from the bend before coming nearly into contact with the bend and following approximately the same path as the bend. In this way, a trench is formed that tracks the curve of the waveguide. An etch/trench near a waveguide bend may approach the bend along a substantially linear path; however, Applicant has realized that a specific non-linear approach results in a net reduction of optical losses over a linear or circular approach. In various embodiments, the shape and length of waveguide bend are selected to result in reduced or minimized losses. In another embodiment, the etch may approach the waveguide before the waveguide is bent, and the curvature of the waveguide being adiabatically changed only after the etch approach is complete.

Figure 2:
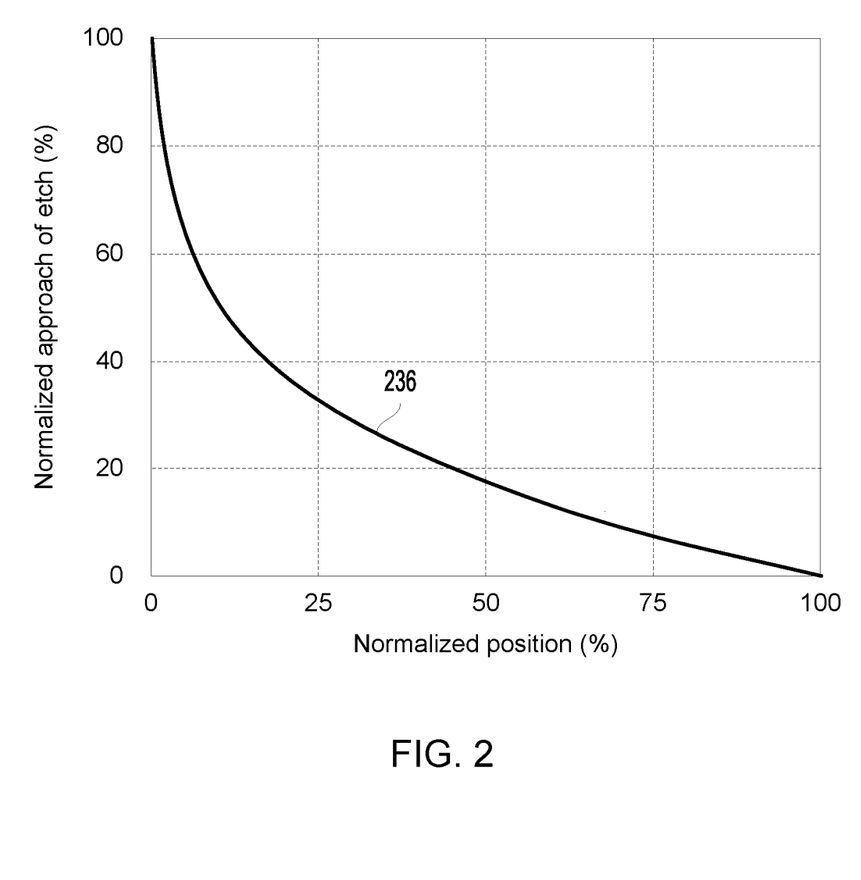
FIG. 2 is a plot, according to an exemplary embodiment of the disclosure, of an approach of an etch to a waveguide represented as a normalized distance between the etch and the waveguide versus normalized position along the waveguide.

Refer now to the exemplary embodiment of FIG. 2 wherein a deep etch approach to a waveguide bend exemplary of the disclosure is illustrated in a plot. This plot shows the curvature of the etched boundary. The approach, plotted 236 as a normalized distance of the etch away from the waveguide as a function of normalized position along the waveguide/light propagation path, is substantially non-linear. Typical and preferred values of etch approach are identified below as a function of normalized position along the light propagation path in the waveguide as shown in Table 1. In some embodiments, the full range may be used. In many embodiments, the preferred range is used.

TABLE 1

| Position (%) | Full range of normalized approach (%) | Preferred range of normalized approach (%) |
| --- | --- | --- |
| about 0 | about 100 | about 100 |
| about 10 | about 30-70 | about 40-60 |

TABLE 1-continued

| Position (%) | Full range of normalized approach (%) | Preferred range of normalized approach (%) |
| --- | --- | --- |
| about 30 | about 15-50 | about 20-30 |
| about 100 | about 0 | about 0 |

A curved trench formed near a waveguide bend may be located immediately adjacent, adjacent, or positioned to otherwise track the bend of the waveguide. That is, the edge of the etched trench may be coincident with the edge of the waveguide. However, any etched trench will have uncertainty in its alignment, and an exact placement of an etch wherein the edge of the etch and the edge of a waveguide exactly coincide is difficult in practice. A trench formed by etching near a bend is often placed a distance away from the bend. Etching at a specified distance from the waveguide may accommodate average or worst-case expectations in etch alignment due to process variations, so that no part of the waveguide is etched away.

In various designs, etching into the waveguide, as part of trench formation, may introduce additional sidewall roughness in the waveguide and hence additional scattering losses. However, Applicant has realized that an etch overlapping a bend is preferable in net reduction of worst-case radiation loss when compared to an etch placed some distance away from the bend and that waveguide material lost during the etch may be compensated by widening the waveguide. This is understood when considering the inherent alignment uncertainty in planar fabrication between the placement of the ridge and the trench etch and the resulting worst-case radiation loss penalty. When accounting in design for the narrowing of the waveguide by the etch overlap, the worst-case performance penalty of the etch overlap, within the fabrication alignment uncertainty to the ridge, can be substantially smaller than the worst-case performance penalty resulting from the etch being away from the ridge in a bend, within the same etch alignment uncertainty to the ridge.

Figure 3:
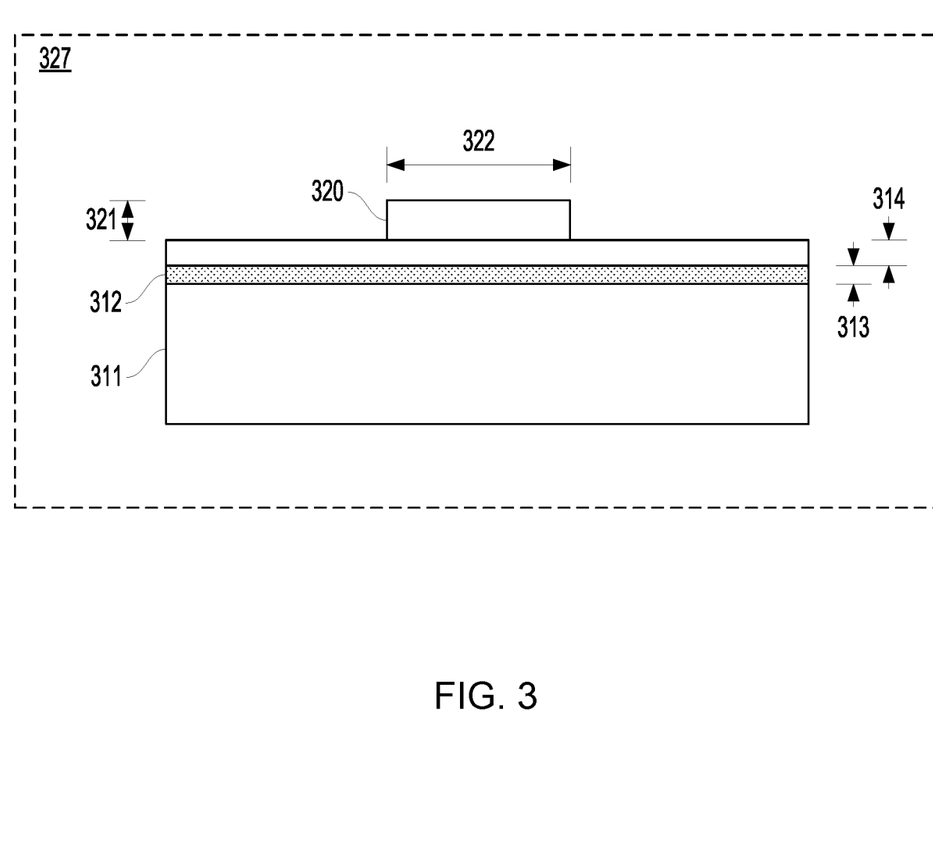
FIG. 3 is a cross-sectional view of a ridge extending from upper surface of elongate structure of waveguide and a confinement layer according to an exemplary embodiment of the disclosure.

Refer now to the exemplary embodiment of FIG. 3 wherein a cross-sectional view through a plane or slice 327 of elongate structure of waveguide near a waveguide bend is illustrated. In some embodiments, the slice 327 may correspond to slice 127 shown in FIG. 1. The cross section includes a substrate 311, typically including Si, InP, and/or GaAs, a confinement layer 312, typically containing $SiO_2$, AlGaInAs, and/or InGaAsP, and a ridge of a waveguide 320, typically including Si, InP, and/or GaAs. In some embodiments, the confinement layer is configured to vertically confine light when the light is propagating in a horizontal direction. In some embodiments, the confinement layer includes a low refractive-index dielectric layer for a Si ridge, a high index dielectric layer for a dielectric waveguide or at least one quantum well for a compound semiconductor waveguide. An electrode may be disposed above the confinement layer to receive an electrical signal and pump the quantum wells. In some embodiments, a compound semiconductor includes a semiconductor material made of more than one element such as InP, GaAs, InGaAs, AlGaInAs, etc. and combinations thereof. In some embodiments, a dielectric material is used such as an optically transparent material with high bandgap and low carrier mobility such as SiO2, Si3N4, SiON, combinations thereof, etc., and other suitable semiconductor or optically transmissive materials.

In most embodiments of the disclosure, a waveguide includes a ridge and a confinement layer, though some amount of light extends into the substrate. Generally, a waveguide is any structure that guides the propagation of light. Generally, the ridge and the confinement layer will form the waveguide in many embodiments. The width of the ridge and its distance from the trench and/or proximity to a step in the trench varies.

In various embodiments, some light will extend into the substrate. In some embodiments, the confinement layer is configured to prevent the optical mode from leaking into the substrate. The confinement layer has a thickness 313 between about 10 to 300 nm and some depth 314 below the ridge, between about 50 to about 2000 nm. In many embodiments, the confinement layer is part of the waveguide. The ridge 320 of the waveguide has a height 321 that ranges between about 0.5 to 3 μm or between about 1 to about 2 μm, and some width 322, between about 1 to 10 μm or between about 2 μm, to about 4 μm. In some embodiments, the height of the ridge ranges from about 1 μm to about 2 μm and its width ranges from about 2 μm to about 4 μm.

Figure 4:
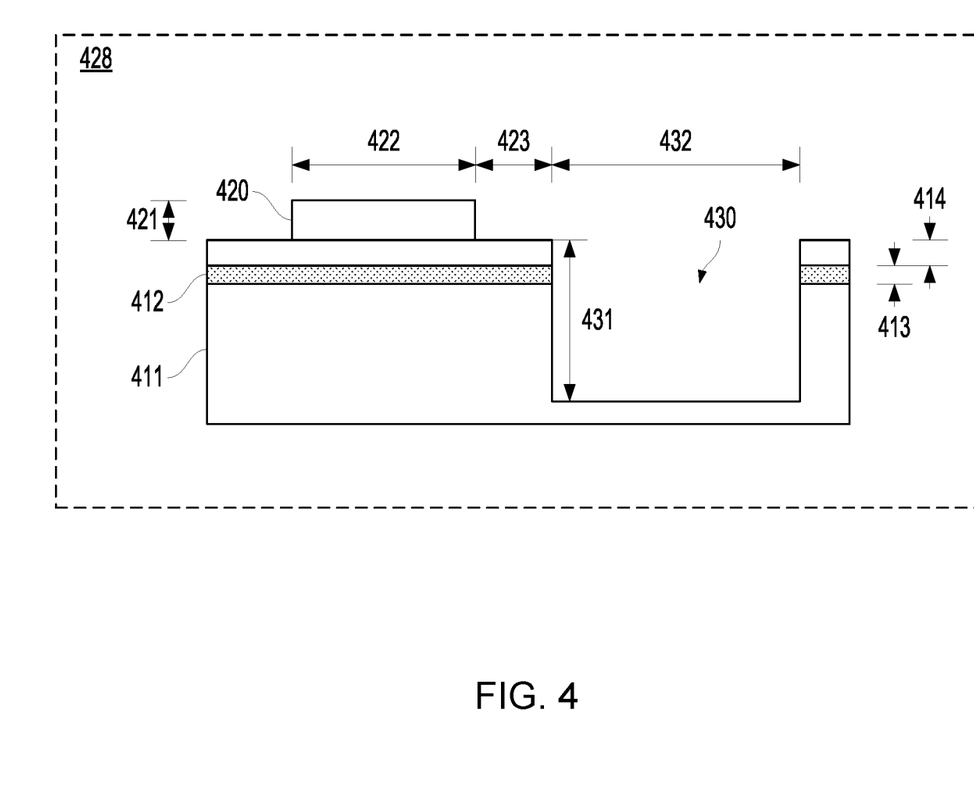
FIG. 4 is a cross-sectional view according to an exemplary embodiment of the disclosure of a waveguide and a deep etch wherein the etch lies some distance away from the waveguide, i.e. the etch approaches the waveguide in one or more sections of the elongate waveguide.

Refer now to the exemplary embodiment of FIG. 4 wherein a cross-sectional view through a plane or slice 428 near a waveguide bend, as the trench or air gap 430 approaches the bend, is illustrated. In some embodiments, the slice 428 may correspond to slice 128 shown in FIG. 1. The cross section includes a substrate 411, typically InP or GaAs, a confinement layer 412, typically AlGaInAs or InGaAsP, and a ridge of a waveguide 420, typically InP or GaAs. The same distance ranges, parameters and materials described with regard to FIG. 3 and otherwise herein may also apply to waveguide 410, the confinement layer 412, and substrate 411, although other materials and combinations of materials may be used in other embodiments. The waveguide has a ridge 420 that has a width 422 that ranges from about 1 μm to about 10 μm or from about 2 μm to about 4 μm. The trench 430 formed by the deep etch has a depth 431, between about 1 to 10 μm or between about 2 to about 5 μm or between about 3 to about 4 μm. The trench 430 has a width 432, that ranges from about 1 to about 200 μm or between about 2 to about 30 μm, and some offset 423, that ranges from between about 0 to about 1 μm or between about 0.2 to about 0.5 μm, away from the edge of the waveguide 420. As the deep etch approaches the waveguide, the offset 423 tends toward zero.

Figure 5A:
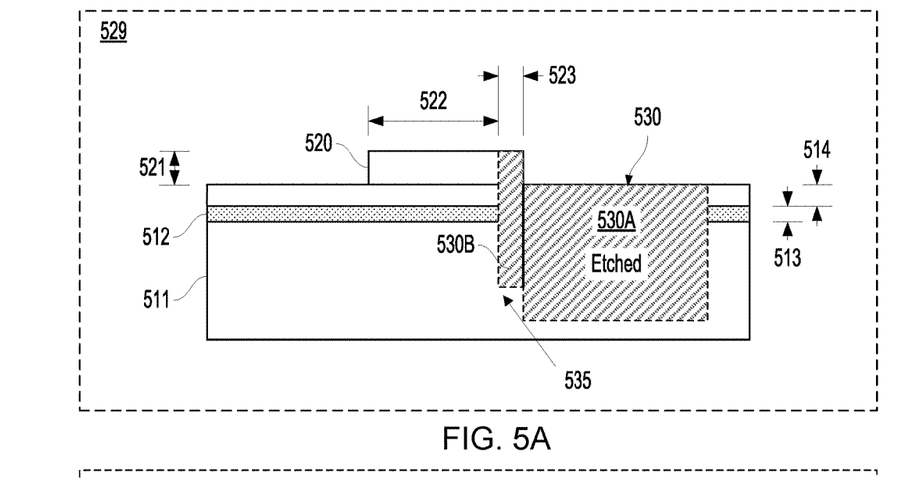
FIG. 5A is a cross-sectional view according to an exemplary embodiment of the disclosure of a waveguide and having a region identified for a deep etch to form a trench wherein the etch partially overlaps the waveguide.
Figure 5B:
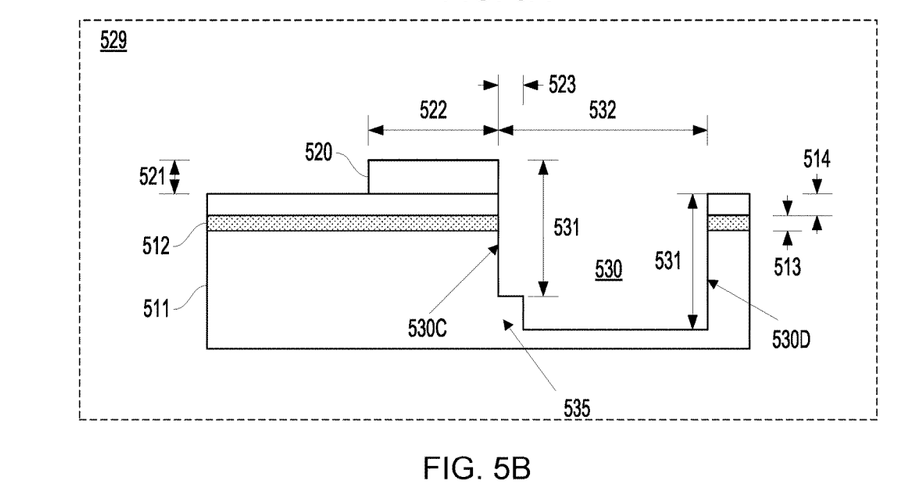
FIG. 5B is a cross-sectional view according to an exemplary embodiment of the disclosure of a waveguide after the deep etch has been performed to form a trench in the region identified in FIG. 5A.

Referring now to the exemplary embodiment of FIGS. 5A and 5B wherein a cross-sectional view through a plane or slice 529 near a waveguide bend is illustrated. In some embodiments, the slice 529 may correspond to slice 129 shown in FIG. 1. In FIG. 5A the trench 530 formed by an etching process now includes a region 530A overlapping the substrate and a region 530B overlapping the waveguide, reducing the waveguide width 522 by the offset 523. This region of overlap may correspond to portions of sections 125b and 125c of FIG. 1 in various embodiments. As discussed, however, the ridge waveguide width 522 is widened to compensate for the loss of material due to the etch in some embodiments when selecting the initial ridge width/waveguide width. In some embodiments, a step 535 may be formed as a result of etching the trench which is defined by regions 530A and 530B.

As a result, as shown in FIG. 5B, in various embodiments, the side 530C of the ridge waveguide 522 defines a portion of a trench 530, such as defining a sidewall of the trench 530C. In some embodiments, the said trench includes a step 535 that extends from a sidewall 530C of the trench 530. In various embodiments, the cross-section 529 shown in FIG. 5B, is present in various sections of the waveguide structure such as sections 132, 133, and 134 of FIG. 1. In FIG. 5B, the deep etch forms a trench 530 and has a depth 531, between about 1 to about 10 μm or between about 2 to about 5 μm or between about 3 to about 4 μm, and some width 532, between about 1 to 200 μm or between about 2 to 20 μm. The waveguide 520 has a height 521, between about 0.5 to about 3 μm or between about 1 to about 2 μm.

In some embodiments, in anticipation of loss of waveguide material in an overlap of a deep etch, as part of forming a trench that follows the waveguide bend, the waveguide may be widened. This width can be selected during the initial design phase and prior to the application of an etch to form the trench. In most embodiments, the waveguide is widened/wider in a region where the waveguide is straight such as along section 125a and at cross-section 127, for example, in FIG. 1. As an example of such widening, in the absence of material loss due to the etch, the waveguide width reaches a maximum at the edges of the bend and the width remains constant through the course of the bend. In many embodiments, in the presence of material loss in the waveguide due to the etch, the waveguide may exhibit a non-uniform width through the course of the bend. In some embodiments, the typical lithographic misalignment between the ridge and the trench definition, as will be appreciated by people of skill in the art of microfabrication, will lead to a changing amount of etched away material from the ridge around the bend and hence to a changing final width around the bend.

Figure 6:
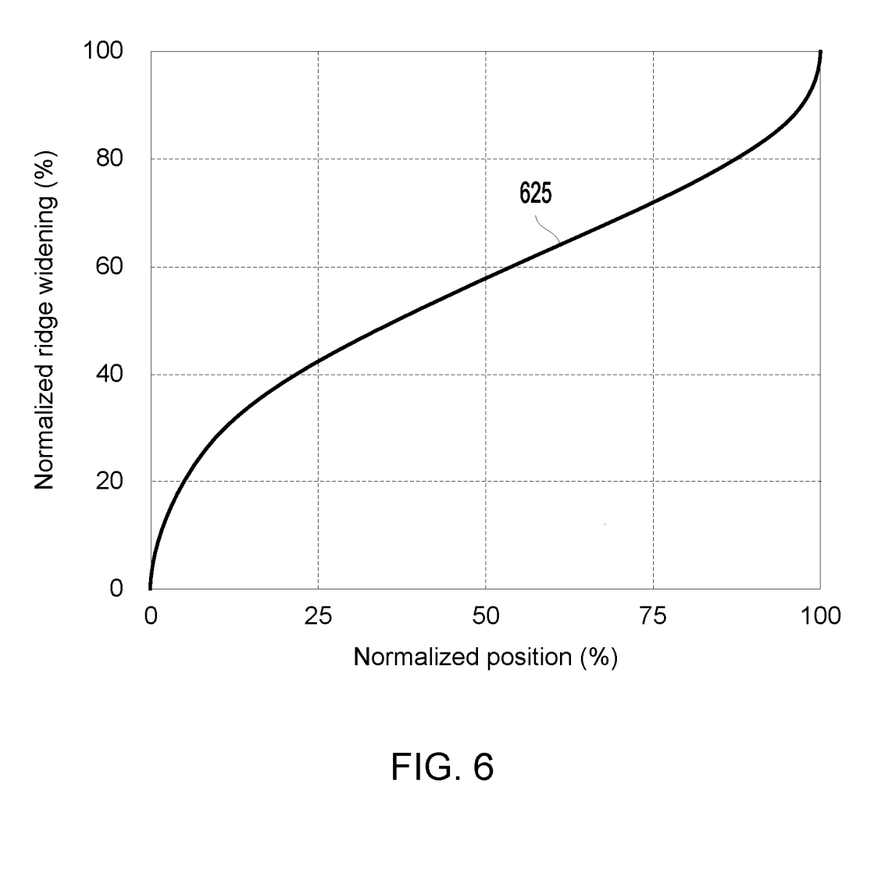
FIG. 6 is a plot of a normalized change in waveguide width changes as a function of normalized position along the waveguide according to an exemplary embodiment of the disclosure.

Refer now to the exemplary embodiment of FIG. 6 wherein a percent increase in the waveguide width as a function of normalized position in the waveguide bend is plotted 625. A normalized position of 100% corresponds to the end of the etch approach into the waveguide and the beginning of the waveguide bend or the waveguide curvature transition region. Typical and preferred values of the normalized waveguide increase, for various embodiments, are shown below in Table 2 as a function of normalized position along the waveguide. In various embodiments, the values below correspond to the width of the ridge referenced herein which is a ridge waveguide.

TABLE 2

| Position (%) | Full range of ridge widening (%) | Preferred range of ridge widening (%) |
|---|---|---|
| about 0 | about 0 | about 0 |
| about 20 | about 25-60 | about 30-50 |
| about 80 | about 60-90 | about 65-85 |
| about 100 | about 100 | about 100 |

In some embodiments, power losses in a waveguide bend are sensitive to the shape of the bend. For example, some non-circular bends, i.e. bends having non-constant curvature, may exhibit lower power loss than a bend with constant curvature. Waveguide bends composed of Euler curves or waveguide bends featuring linear transitions in curvature may reduce power loss in the bend. In contrast with these approaches, which are preferably avoided in some embodiments, Applicant has realized that a non-linear transition in curvature paired with a section of constant curvature reduces power loss in the bend further still.

Figure 7A:
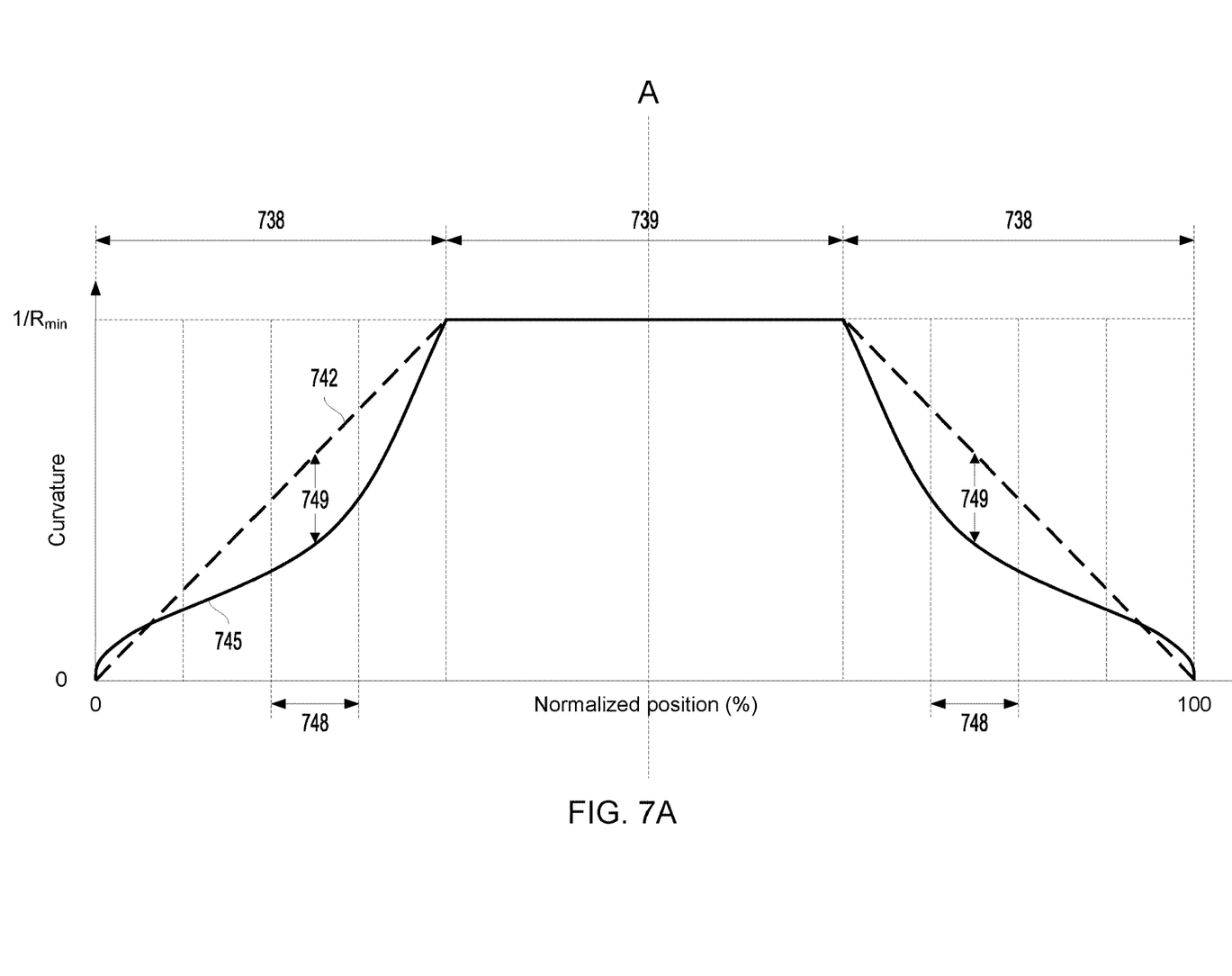
FIG. 7A is a plot of curvature of a waveguide as a function of normalized position along the waveguide according to an exemplary embodiment of the disclosure.

Refer now to the embodiment of FIG. 7A wherein a non-linear transition in curvature 738 exemplary of the disclosure is illustrated by way of a plot of waveguide curvature 745 as a function of normalized waveguide position. The axis A shown corresponds to the axis A of FIG. 1. The plot 745 shown in FIG. 7A illustrates a non-linear transition in curvature space that deviates from the linear transition 742 that would be associated with a Euler bend. A circular bend would exhibit an abrupt change, or a step change, in curvature space (not pictured). With regard to FIG. 7A, the waveguide curvature is adjusted adiabatically and in a non-linear fashion from zero to a constant $1/R_{min}$ where $R_{min}$ is the radius of curvature of the bend section with constant curvature. Similarly, continuing through the curve of the bend, the waveguide's cross-sectional profile varies from the same adiabatic and non-linear fashion from the constant $1/R_{min}$ back to zero. This curve may be mapped to the A axis in FIG. 1 by adding the A axis to FIG. 7A to show how the different sections (central constant radius of curvature section 133 and the two sections of non-linear curvature changes 132, 134 are oriented). The waveguide begins at 0% in the normalized position axis and with zero curvature (or zero bend angle), corresponding to a straight waveguide. The normalized position refers to the relative position along the light propagation path in the bend.

Relative to a linear transition 742 in curvature, an adiabatic transition 745 is numerically optimized to provide better overall transition loss. In various embodiments, optimization routines may be selected to produce a reduction 749 in curvature in the third quadrant 748 that ranges from about 10% to about 60% of the curvature in the linear curvature case. The ridge waveguide curvature shape transition can be optimized using either eigenmode expansion with a cylindrical mode solver, 3D finite difference time domain or combinations thereof. The etch approach transition can be optimized using either eigenmode expansion or 3D finite difference time domain. These computational techniques can be combined with optimization routines such as particle swarm optimization or a kriging predictor.

In many embodiments, after a non-linear transition 738 in curvature, the waveguide exhibits a constant curvature, before transitioning back to a straight waveguide with the same non-linear pattern 738. The length of the constant curvature section 739 is given by $R_{mix}(\theta_{total}-2\theta_{tape})$ where $\theta_{total}$ is the desired full change in waveguide angle induced by the bend and $\theta_{taper}$ is the change in waveguide angle induced by each curvature taper section. The absolute length of the curvature taper section 738 may range from about 5 µm to about 200 µm and preferably between about 10 to about 100 µm. The curvature taper angle may vary from between about 2 to about 45 degrees and preferably between about 10 to about 35 degrees. The maximum curvature $1/R_{min}$ is between about 1 to about 100 mm$^{-1}$ and preferably between about 5 to about 20 mm$^{-1}$. In various embodiments, any change greater than $2\theta_{taper}$ in waveguide angle induced by the bend is acceptable.

Figure 7B:
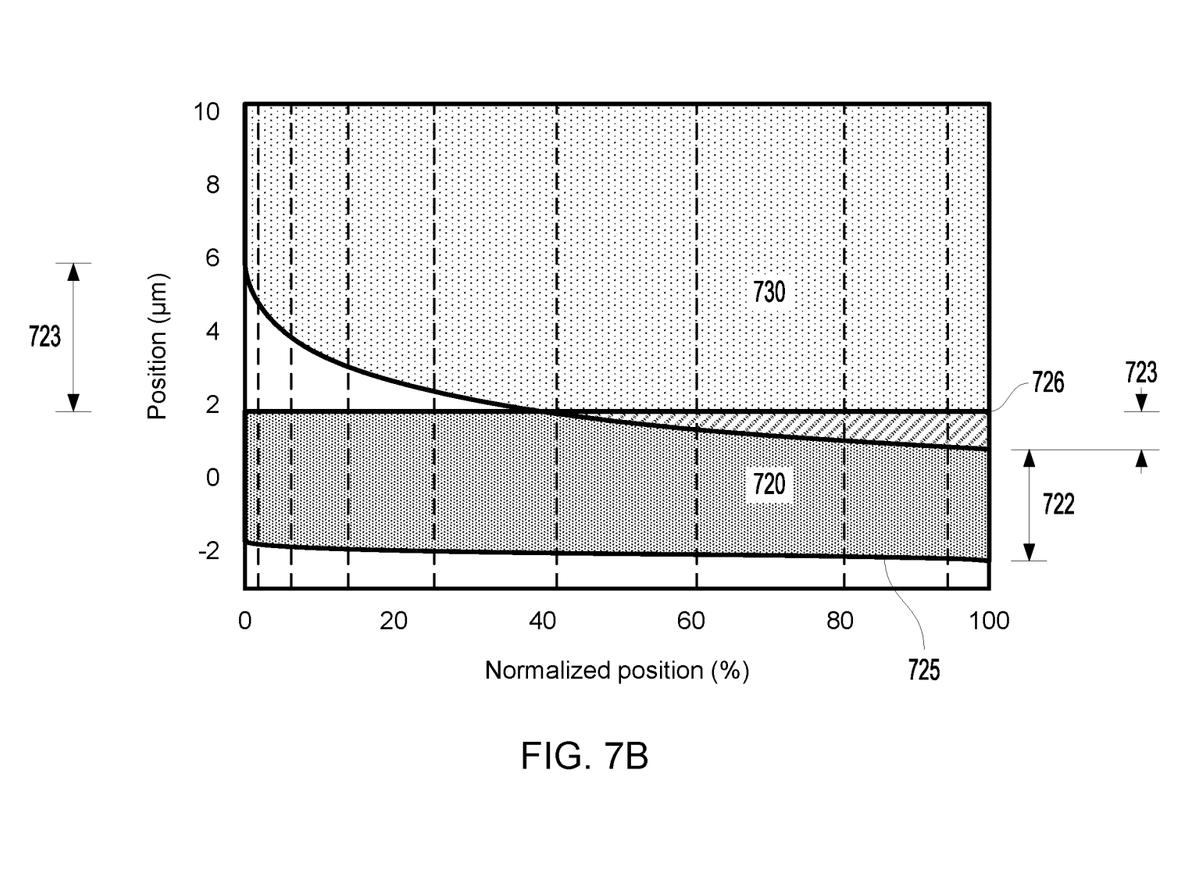
FIG. 7B is a top-down view of a deep etch as it approaches a waveguide, a top-down view of the overlap between the trench and the waveguide, and a top-down view of the widening of the waveguide according to exemplary embodiments of the disclosure.

Refer now to the embodiment of FIG. 7B wherein a top-down view near a waveguide bend exemplary of the disclosure illustrates an etch approach to forming a trench exterior to the waveguide, a waveguide widening, and an overlap between the etch 730 and the ridge waveguide 720 in a normalized position along the waveguide. The total path length over which the waveguide 720 exhibits a taper in width is between about 50 to about 500 µm or between about 100 to about 250 µm or about 150 µm. At the beginning of the etch approach 737 the gap 723 between the etch and waveguide is between about 1 to about 10 µm or between about 3 to about 5 µm or about 4 µm. In various embodiments, near normalized position 100%, the gap 723 may correspond to a step that remains in the trench, bounded by edge of the ridge, in part, after the deep etch forms a trench that overlaps with the ridge. For example, the gap 723 may correspond to step 535 in FIGS. 5A and 5B in various embodiments. In some embodiments, the upper extent of region 730 may correspond to the width of the etch. Over the course of the taper, the ridge width 722 is increased by some value between about 0 to about 1 µm or between about 0.25 to about 0.5 µm. Note that the interior border of the waveguide is moved 725 to widen the waveguide while the exterior border remains straight 726 in the normalized-position coordinates. Referring back to the plot in FIG. 6, this plot corresponds to the transition in FIG. 2 and FIG. 7B. FIG. 7A considers curvature of the waveguide, there is no waveguide curvature on FIGS. 2, 6 and 7B. In some embodiments, the etch approach and waveguide width transition described in FIGS. 2, 6, and 7B are placed before and after the curvature transitions described in FIG. 7A.

Figure 8:
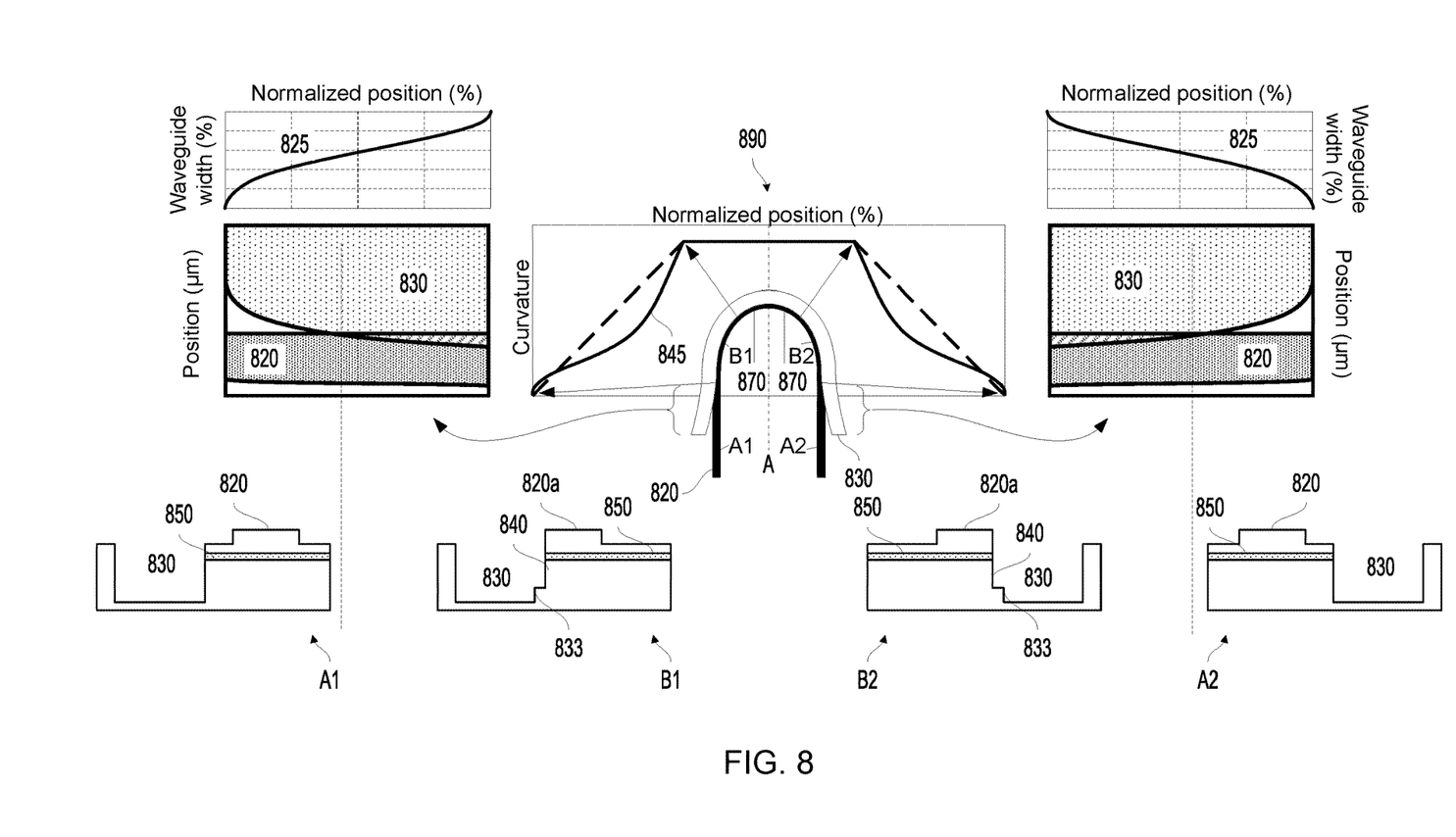
FIG. 8 is schematic diagram showing an embodiment of a curved waveguide that includes a ridge, wherein the wave guide includes two or more sections that have differing cross-sectional shapes along the length of each such section and the associated cross-sections and related data plots summarizing various features of various exemplary embodiments of the disclosure.

Finally, refer to the embodiment of FIG. 8 wherein a summary schematic diagram is depicted that cross-references various illustrations of various curved waveguide embodiments. These waveguides may be fabricated with various materials. In some embodiments, compound semiconductor materials, etch, and fabrication techniques are used. FIG. 8 shows how the ridge waveguide embodiments 820, 820a and etch/trench 830, experience cross-sectional changes including with regard to the etch approach, and waveguide widening 825, and waveguide curvature transition 845, and constant curvature 870 in the various sections of the center plot 890. In some embodiments, the waveguide widens 825 only when the waveguide is straight, i.e. when waveguide curvature is zero. In other embodiments, the waveguide may be widened and the curvature transition may occur before the etch transition is complete. In various embodiments, as shown, the etch/trench 830 approach occurs outside the region of waveguide curvature as shown in cross-sections A1 and A2. In cross-sections B1, B2, the trench 830 is defined by the ridge 820a and include a step 833. A1, A2, B1, and B2 are also shown relative to center plot 890. Specifically, the ridge 820a defines a sidewall 840 such as an inner sidewall of the trench 820a. In various, embodiments, the width of ridge 820a is smaller than ridge 820. In some embodiments, this distance in width corresponds to the width of step 833. An exemplary confinement layer 850 is also shown below the ridge 820, 820a in the various cross-sections in the bottom portion of FIG. 8. In some embodiments the step 833 may be rounded, sloped or substantially roughened.

In various embodiments, the curved waveguides disclosed herein avoid an Euler bend, which involves a linear change of curvature with path resulting in triangular curvature plot with position. The proposed curved waveguides disclosed herein have lower losses when compared to an Euler bend. Further, the inclusion of an air trench on both sides of waveguide having an Euler bend also creates substantial scattering losses. Further, including air trenches on both sides of the waveguide creates cooling issues in active waveguides, which the present disclosure avoids. The present disclosure also advantageously supports the use of compound semiconductors.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A photonic device comprising:
   an optical inlet;
   an optical outlet;
   a curved waveguide comprising:
      a plurality of layers;
      a curved elongate structure defining an upper surface, an inner elongate surface, and an outer elongate surface, the curved elongate structure comprising
         a first end, and
         a second end, the first end in optical communication with the second end; and
      a ridge extending from the upper surface, the ridge having a first side and a second side, wherein the ridge has a ridge width; and
      a trench defined by one or more of the plurality of layers and the first side;
   wherein the curved elongate structure defines a first elongate section, a second elongate section, and a third elongate section,
   wherein a first cross-section of the ridge has a first shape that substantially extends along the first elongate section of the structure,
   wherein the first shape is defined by the first side and a step extending from the first side and above the bottom of the trench,
   wherein the optical inlet is in optical communication with the first end;
   wherein the optical outlet is in optical communication with the second end;
   wherein the curved waveguide defines a bend in the first elongate section, wherein the first elongate section has a constant radius of curvature, wherein the second elongate section comprises a non-linear curvature transition, wherein the trench approaches the curved waveguide in the third elongate section, wherein the ridge width increases from a first width with increased distance along the third elongate section in a direction from the second elongate section towards a first or second end such that at a position at about 20% of the length of the third elongate section, the ridge width ranges from about 30% to about 50% more than the first width; and when the position is at about 80% of the length of the third elongate section, the ridge width ranges from about 65% to about 85% more than the first width.

2. The photonic device of claim 1, wherein the trench follows the first side and bends therewith.

3. The photonic device of claim 1, wherein the second elongate section comprises a curvature transition section wherein curvature changes in the curvature transition section are non-linear in curvature space.

4. The photonic device of claim 3, wherein at a position of 50 to 75% along the optical path of the curvature transition section, the curvature is reduced by about 10% to about 60% of a linear curvature in curvature space.

5. The photonic device of claim 3, wherein the curvature transition section transitions to a section of constant curvature in the first elongate section, wherein the first elongate section defines a bend.

6. The photonic device of claim 5, wherein a curvature of the bend ranges from about 1 mm$^{-1}$ to about 100 mm$^{-1}$ or from about 5 mm$^{-1}$ to about 20 mm$^{-1}$.

7. The photonic device of claim 1, wherein one or more of the plurality of layers comprise a compound semiconductor.

8. The photonic device of claim 1, wherein the curved waveguide further comprises a confinement layer disposed below the ridge, the confinement layer comprising a plurality of quantum wells.

9. The photonic device of claim 8, wherein the confinement layer is configured to not absorb propagating light in response to being in one or more pumped states.

10. The photonic device of claim 1, wherein the ridge has a ridge width, wherein the ridge width increases in an amount that ranges from about 0 to about 1 μm or about 0.25 μm to about 0.5 μm over a transition distance.

11. The photonic device of claim 1, wherein a starting gap between the trench and the ridge ranges from about 1 μm to 10 μm, or from about 3 μm to about 5 μm, or is about 4 μm.

12. The photonic device of claim 11, wherein the gap between the trench and the ridge has been reduced by 50 to 70% from the starting gap at a position of 20% along the third elongate section.

13. The photonic device of claim 1, wherein the trench comprises the bottom, an outer trench wall and an inner trench wall, wherein the inner trench wall is defined by the step that extends upwards from the bottom.

14. The photonic device of claim 13, wherein the step has a width that ranges from about 0.1 to about 1 μm.

15. The photonic device of claim 1, wherein the curved waveguide is configured to propagate light received from the optical inlet having a wavelength that ranges from about 1250 nm to about 1650 nm.

16. The photonic device of claim 1 further comprising one or more optical amplifier devices in optical communication with the first end or the second end.

17. A photonic device comprising:
an optical inlet;
an optical outlet;
a curved waveguide comprising
a plurality of layers;
a curved elongate structure defining an upper surface, an inner elongate surface, and an outer elongate surface, the curved elongate structure comprising
a first end, and
a second end, the first end in optical communication with the second end; and
a ridge extending from the upper surface, the ridge having a first side and a second side, wherein the ridge has a ridge width; and
a trench defined by one or more of the plurality of layers;
wherein the curved elongate structure defines a first elongate section, a second elongate section, and a third elongate section,
wherein the optical inlet is in optical communication with the first end;
wherein the optical outlet is in optical communication with the second end;
wherein the curved waveguide defines a bend in the first elongate section, wherein the first elongate section has a constant radius of curvature, wherein the second elongate section comprises a non-linear curvature transition, wherein the trench approaches the curved waveguide in the third elongate section, wherein a length over which the curved waveguide exhibits a taper in width is between about 50 to about 500 μm, or between about 100 to about 250 μm, or about 150 μm.

18. A method for curving light in an integrated photonic structure comprising:
providing a curved waveguide comprising:
a plurality of layers;
a curved elongate structure defining an upper surface, an inner elongate surface, and an outer elongate surface, the curved elongate structure comprising
a first end, and
a second end, the first end in optical communication with the second end; and
a ridge extending from the upper surface, the ridge having a first side and a second side;
a trench defined by one or more of the plurality of layers and the first side; and
a confinement layer disposed below the ridge, the confinement layer comprising a plurality of quantum wells;
wherein the curved elongate structure defines a first elongate section and a second elongate section,
wherein a length over which the curved waveguide exhibits a taper in width is between about 50 to about 500 μm, or between about 100 to about 250 μm, or about 150 μm,
wherein a first cross-section of the ridge has a first shape that substantially extends along the first elongate section of the structure,
wherein the first shape is defined by the first side and a step extending from the first side and above the bottom of the trench;
propagating light of a wavelength between 1250 and 1650 nm in the ridge; and
applying an electrical signal to pump the plurality of quantum wells through an electrode disposed on the ridge to pump one or more quantum wells.

* * * * *